United States Patent
Du et al.

(10) Patent No.: US 9,951,257 B2
(45) Date of Patent: Apr. 24, 2018

(54) CAULKING ADHESIVE

(71) Applicant: WUHAN KEDA MARBLE PROTECTIVE MATERIALS CO., LTD., Wuhan (CN)

(72) Inventors: Kunwen Du, Wuhan (CN); Kunwu Du, Wuhan (CN); Qiong Lei, Wuhan (CN); Yunfei Wang, Wuhan (CN)

(73) Assignee: WUHAN KEDA MARBLE PROTECTIVE MATERIALS CO., LTD., Wuhan (CN)

( * ) Notice: Subject to any disclaimer, the term of this patent is extended or adjusted under 35 U.S.C. 154(b) by 248 days.

(21) Appl. No.: 14/954,982

(22) Filed: Nov. 30, 2015

(65) Prior Publication Data

US 2016/0083632 A1    Mar. 24, 2016

Related U.S. Application Data

(63) Continuation-in-part of application No. PCT/CN2014/078899, filed on May 30, 2014.

(30) Foreign Application Priority Data

Jun. 5, 2013 (CN) .......................... 2013 1 0220886

(51) Int. Cl.
    *C09J 163/00*             (2006.01)
    *C08G 59/50*              (2006.01)
    (Continued)

(52) U.S. Cl.
    CPC ............ *C09J 163/00* (2013.01); *C08G 59/50* (2013.01); *C08K 3/22* (2013.01); *C08K 3/26* (2013.01);
    (Continued)

(58) Field of Classification Search
    CPC ................................................. C09J 163/00
    See application file for complete search history.

(56) References Cited

U.S. PATENT DOCUMENTS

4,141,144 A * 2/1979 Lustgarten ............ A61K 6/083
                                                 260/998.11
4,547,531 A * 10/1985 Waknine ................ A61K 6/083
                                                 433/199.1

(Continued)

OTHER PUBLICATIONS

International search report, PCT/CN2014/078899, dated Sep. 4, 2014 (Year: 2014).*

(Continued)

*Primary Examiner* — Megan McCulley
(74) *Attorney, Agent, or Firm* — Matthias Scholl, PC; Matthias Scholl

(57) ABSTRACT

An epoxy caulking adhesive, including: a component A and a component B. The component A at least includes the following components in parts by weight: between 50 and 100 parts of an epoxy resin, between 0 and 100 part(s) of an inorganic filler, between 0 and 20 part(s) of a thickener. The component B at least includes the following components in parts by weight: between 20 and 100 parts of an amine curing agent, between 0 and 150 part(s) of the inorganic filler, and between 0 and 25 part(s) of the thickener. The weight ratio of the component A to the component B is between 1:1 and 10:1. At least one of the inorganic filler and the thickener exists in both the component A and the component B.

5 Claims, 1 Drawing Sheet

(51) Int. Cl.
*C08K 3/22* (2006.01)
*C08K 3/26* (2006.01)
*C08K 3/34* (2006.01)
*C08K 5/098* (2006.01)
*C08K 5/1515* (2006.01)
*C08K 5/3417* (2006.01)

(52) U.S. Cl.
CPC .............. *C08K 3/346* (2013.01); *C08K 5/098* (2013.01); *C08K 5/1515* (2013.01); *C08K 5/3417* (2013.01); *C08K 2003/2241* (2013.01); *C08K 2003/265* (2013.01)

(56) References Cited

U.S. PATENT DOCUMENTS

| | | | | |
|---|---|---|---|---|
| 4,820,549 A * | 4/1989 | Ozaki | ............ | C08G 59/145 427/306 |
| 5,604,266 A * | 2/1997 | Mushovic | ........... | B29C 44/3446 521/122 |
| 2002/0115736 A1* | 8/2002 | Koshy | ............ | C08J 9/32 521/99 |
| 2003/0153643 A1* | 8/2003 | Jin | ............ | C08K 3/22 522/81 |
| 2004/0131840 A1* | 7/2004 | Ferguson | ............ | C08J 9/32 428/317.9 |
| 2004/0132857 A1* | 7/2004 | Barton | ............ | G03F 7/027 522/168 |
| 2005/0143496 A1* | 6/2005 | Mueller | ............ | C08G 59/54 523/400 |
| 2006/0021888 A1* | 2/2006 | Andre | ............ | B65D 65/42 206/315.9 |
| 2006/0029811 A1* | 2/2006 | Sugioka | ............ | C08L 61/28 428/413 |
| 2006/0131928 A1* | 6/2006 | Onizawa | ............ | C08J 5/12 296/146.15 |
| 2006/0205897 A1* | 9/2006 | Frick | ............ | C08G 59/18 525/524 |
| 2007/0122361 A1* | 5/2007 | Jia | ............ | A61K 8/87 424/53 |
| 2008/0200607 A1* | 8/2008 | Ando | ............ | C08L 43/04 524/588 |
| 2009/0012209 A1* | 1/2009 | Eckhardt | ............ | A61K 6/0017 523/116 |
| 2013/0189624 A1* | 7/2013 | Koda | ............ | C08F 2/50 430/280.1 |

OTHER PUBLICATIONS

Written Opinion, PCT/CN2014/078899, dated Sep. 3, 2014 (Year: 2014).*

* cited by examiner

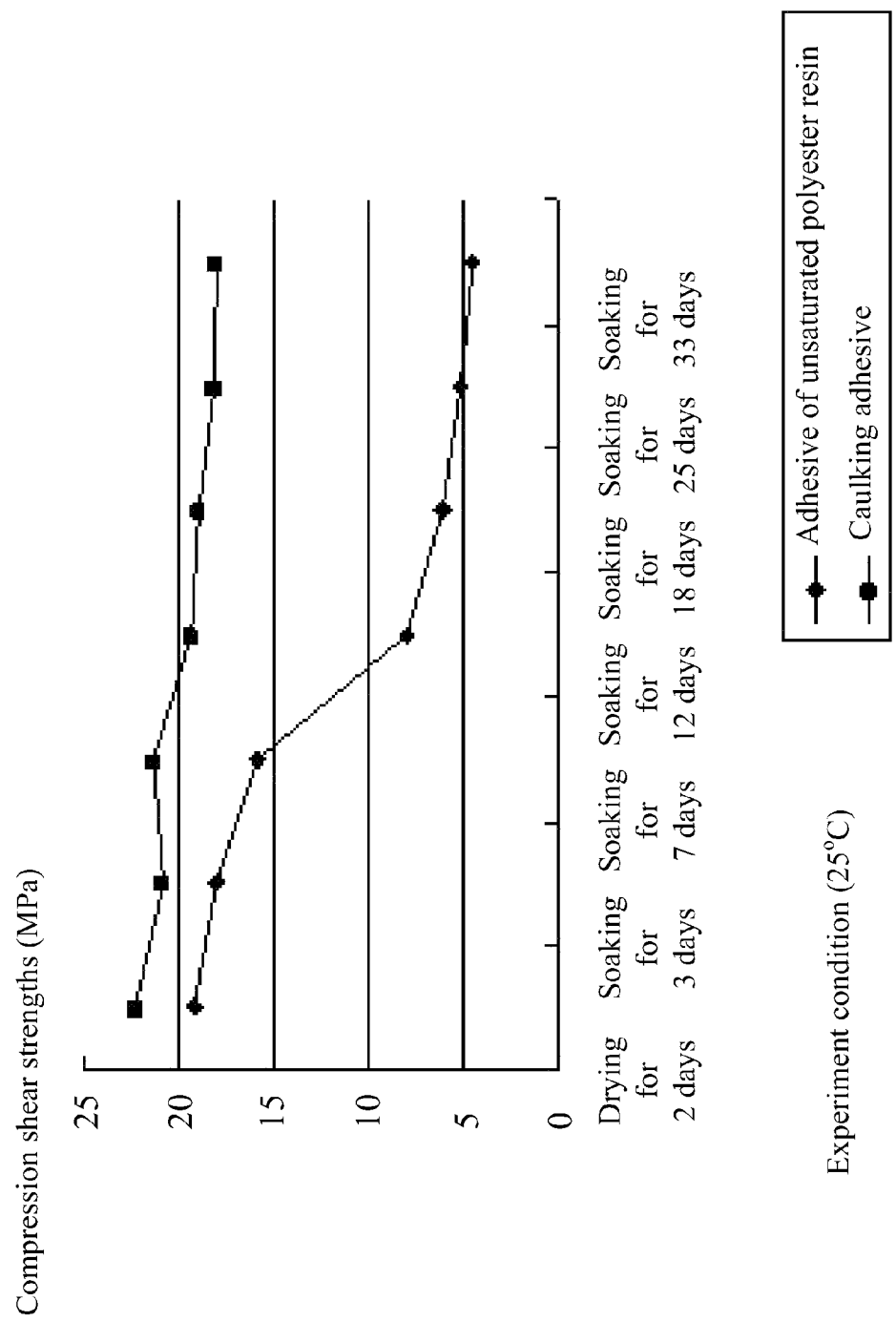

CAULKING ADHESIVE

CROSS-REFERENCE TO RELATED APPLICATIONS

This application is a continuation-in-part of International Patent Application No. PCT/CN2014/078899 with an international filing date of May 30, 2014, designating the United States, now pending, and further claims priority benefits to Chinese Patent Application No. 201310220886.6 filed Jun. 5, 2013. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to an epoxy caulking adhesive.

Description of the Related Art

Unsaturated polyester resin is widely used for caulking stone materials. However, it contracts significantly as it cures, which often leads to failure of attachment or uneven finish.

In addition, unsaturated polyester resin is not suitable for use in humid environment because water causes the bonding strength thereof to decrease.

SUMMARY OF THE INVENTION

In view of the above-described problems, it is one objective of the invention to provide an epoxy caulking adhesive adapted to use in humid environment. The epoxy caulking adhesive features high bonding strength, good aging resistance, high and low temperature resistance, long service life, fast and convenient operation, water and corrosion resistance, and scrubbing resistance.

To achieve the above objective, in accordance with one embodiment of the invention, there is provided an epoxy caulking adhesive. The epoxy caulking adhesive comprises a component A and a component B. The component A at least comprises the following components in parts by weight: between 50 and 100 parts of an epoxy resin, between 0 and 100 part(s) of an inorganic filler, and between 0 and 20 part(s) of a thickener. The component B at least comprises the following components in parts by weight: between 20 and 100 parts of an amine curing agent, between 0 and 150 part(s) of the inorganic filler, and between 0 and 25 part(s) of the thickener. A weight ratio of the component A to the component B is between 1:1 and 10:1. At least one of the inorganic filler and the thickener exists in both the component A and the component B.

In a class of this embodiment, the component A further comprises the following components in parts by weight: between 1 and 6 part(s) of a pigment, and between 2 and 20 parts of a diluent. The component B further comprises the following components in parts by weight: between 0.5 and 3 part(s) of an accelerator, and between 0.5 and 4 part(s) of a coupling agent.

In a class of this embodiment, the component A comprises the following components in parts by weight: between 50 and 90 parts of the epoxy resin, between 20 and 80 parts of the inorganic filler, between 3 and 10 parts of the thickener, between 1 and 5 part(s) of the pigment, and between 2 and 8 parts of the diluent. The component B comprises the following components in parts by weight: 40-80 parts of modified amine curing agent, between 1 and 2 part(s) of accelerator, between 0.5 and 2 part(s) of coupling agent, between 30 and 100 parts of inorganic filler, and between 2 and 10 parts of thickener.

In a class of this embodiment, the component A comprises the following components in parts by weight: between 60 and 80 parts of epoxy resin, between 30 and 70 parts of inorganic filler, between 8 and 10 parts of thickener, between 3 and 4 parts of pigment, between 3 and 10 parts of diluent. The component B comprises the following components in parts by weight: between 50 and 70 parts of modified amine curing agent, between 1 and 2 part(s) of accelerator, between 0.5 and 1 part(s) of coupling agent, 50-80 parts of inorganic filler, and between 3 and 8 parts of thickener.

In a class of this embodiment, the component A comprises the following components in parts by weight: 60 parts of epoxy resin, 40 parts of inorganic filler, 2 parts of thickener, 4 parts of pigment, 4 parts of diluent. The component B comprises the following components in parts by weight: 54 parts of modified amine curing agent, 2 parts of accelerator, 1 part of coupling agent, 50 parts of inorganic filler, and 3 parts of thickener.

In a class of this embodiment, the component A comprises the following components in parts by weight: 70 parts of epoxy resin, 50 parts of inorganic filler, 10 parts of thickener, 3 parts of pigment, 7 parts of diluent. The component B comprises the following components in parts by weight: 40 parts of modified amine curing agent, 1 part of accelerator, 1 part of coupling agent, 25 parts of inorganic filler, and 3 parts of thickener.

In a class of this embodiment, the component A comprises the following components in parts by weight: 85 parts of the epoxy resin, 50 parts of the inorganic filler, 5 parts of the thickener, 5 parts of the pigment, and 5 parts of the diluent. The component B comprises the following components in parts by weight: 20 parts of the modified amine curing agent, 0.5 part of the accelerator, 0.5 part of the coupling agent, 7 parts of the inorganic filler, and 2 parts of the thickener.

In a class of this embodiment, the component A comprises the following components in parts by weight: 100 parts of the epoxy resin, 100 parts of the inorganic filler, 5 parts of the thickener, 5 parts of the pigment, and 10 parts of the diluent. The component B comprises the following components in parts by weight: 20 parts of the modified amine curing agent, and 2 parts of the thickener.

In a class of this embodiment, the epoxy resin is selected from the group consisting of a bisphenol-A epoxy resin, a bisphenol-F epoxy resin, a bisphenol-S epoxy resin, an epoxy resin of glycidyl ester, an alicyclic epoxy resin, a phenolic epoxy resin, a hydrogenated bisphenol-A epoxy resin, a bisphenol-AD epoxy resin, and a mixture thereof.

In a class of this embodiment, the modified curing agent is selected from the group consisting of an aliphatic amine, an alicyclic amine, an aromatic amine, a polyamide, a modified amine, a phenol-aldehyde amine, a condensation amine, a polymercaptan amine, a hydroxyl alkylate polyamine, and a mixture thereof.

In a class of this embodiment, the inorganic filler is selected from the group consisting of calcium carbonate, a silica fume, barium sulfate, magnesium oxide, a quartz powder, a wollastonite, and clay.

In a class of this embodiment, the coupling agent is selected from the following: a silane coupling agent $RS_iX_3$, in which, R represents chlorine, a hydroxyl group, a carboxyl group, an amino group, a sulfydryl group, a vinyl group, an epoxy group, a cyano group, a cyanoethoxyl group, or a methacryloxy group, and X represents a methoxy group, an ethyoxy group, chlorine, the amino group, the sulfydryl group, glycidyl ether, methyl methacrylate, or the cyanoethoxyl group; and a titanate coupling agent $ROO_{4-n}Ti(OX—R'Y)_n$, in which, n=2, 3, R represents a hydrolysable alkoxy group, OX-represents the carboxyl group, an alkoxy group, a sulfonic group, or phosphorus, R' represents an alkane group, Y represents the hydroxyl group, the amino group, the epoxy group, or a group containing a double bond). The coupling agent comprises: γ-chloropropyl triethoxy silane, γ-aminopropyl triethoxysilane, γ-aminopropyl trimethoxysilane, γ-mercaptopropyl trimethoxysilane, γ-mercaptopropyl triethoxysilane, N-(β-aminoethyl)-γ-aminopropyl trimethoxy silane, isopropyl triisostearoyl titanate, isopropyl isopropyl trioleyl titanate, isopropyl tri(dioctylphosphate acyloxy) titanate, or di(octyl phenol ethoxylate) phospholipid.

In a class of this embodiment, the thickener is selected from the group consisting of a cellulose, a diatomite, an attapulgite, a fumed silica, a bentonite, a precipitated calcium carbonate, a talcum powder, a calcium stearate, and a mixture thereof.

In a class of this embodiment, the pigment of the component A is selected from the group consisting of titanium dioxide, a carbon black, a middle chrome yellow, an iron oxide yellow, an iron oxide red, a chromium oxide green, an ultramarine, a phthalocyanine blue, a phthalocyanine green, a lucifer yellow, an azo organic red pigment, an azo organic yellow pigment, an everbright fast red, a Lithol red, and a mixture thereof.

In a class of this embodiment, the diluent is selected from the group consisting of alkyl glycidyl ether containing between 12 and 14 carbon atoms, benzyl glycidyl ether, butyl glycidyl ether, glycerol polyglycidyl ether, ethylene glycol diglycidyl ether, neopentyl glycol diglycidyl ether, 1,4-butanediol diglycidyl ether, di-n-butyl phthalate, benzyl alcohol, toluene, ethyl acetate, acetone, xylene, propylene carbonate, and a mixture thereof.

In a class of this embodiment, the accelerator is selected from the group consisting of 2,4,6-tris(dimethylaminomethyl) phenol, tri-2-ethyl hexanoate of 2,4,6-tris(dimethylaminomethyl) phenol, trioleate salts of 2,4,6-tris(dimethylaminomethyl) phenol, and benzyldimethylamine.

Compared with the paste of unsaturated polyester resin which features good caulking property, advantages of the epoxy caulking adhesive adapted to use in humid environment are as follows:

1. The unsaturated polyester resin faces big shrinkage when curing, resulting in formation of depressions after caulking, and even the resin adhesive separates from the stone material, so that a shrinkage reducing agent is needed, which increases the usage costs. The epoxy caulking adhesive has nearly zero shrinkage after curing, and no more shrinkage reducing agent is needed, thereby bringing in convenience and good appearance.

2. The mechanical bonding strength of the epoxy caulking adhesive is better than that of the unsaturated polyester resin, as shown by FIG. 1, thereby improving the safety factor during construction process and enlarging the application. In addition, the mechanical data of the epoxy caulking adhesive exceeds the national standard of epoxy dry-hung adhesive. Mechanical contrast data is shown in Table 1.

TABLE 1

Contrast Data of Mechanical Properties

| Items | Flexural moduli (megapascal) | Impact strengths (KJ/m$^2$) | Tensile-shear strengths (megapascal) | Compression shear strengths (megapascal) | Compression shear strengths after soaking 12 days (megapascal) |
|---|---|---|---|---|---|
| National Standard of Epoxy Dry-hand Adhesive | ≥2000.0 | ≥3.0 | ≥8.0 | ≥10.0 | 0 |
| White Adhesive of the unsaturated polyester resin | 4673.2 | 4.8. | 15.6 | 16.1 | 7.9 |
| Example 1 (A:B = 1:1) | 6021.0 | 4.2 | 21.6 | 23.6 | 19.2 |
| Example 2 (A:B = 1:1) | 4534.0 | 5.4 | 15.8 | 19.4 | 14.8 |
| Example 3 (A:B = 1:1) | 6213.3 | 3.8 | 20.4 | 23.3 | 18.9 |
| Example 4 (A:B = 1:1) | 6310.0 | 4.6 | 18.4 | 21.4 | 18.3 |
| Example 5 (A:B = 2:1) | 4621.5 | 4.8 | 17.6 | 19.1 | 15.9 |
| Example 6 (A:B = 2:1) | 6016.0 | 3.2 | 16.4 | 17.4 | 13.7 |
| Example 7 (A:B = 2:1) | 6325.0 | 4.5 | 20.9 | 23.8 | 19.2 |
| Example 8 (A:B = 2:1) | 4803.1 | 5.0 | 16.8 | 18.5 | 14.4 |
| Example 9 (A:B = 3:1) | 5134.5 | 4.6 | 19.4 | 21.6 | 17.0 |
| Example 10 (A:B = 3:1) | 5935.0 | 3.2 | 20.7 | 21.1 | 16.6 |
| Example 11 (A:B = 4:1) | 6023.4 | 3.6 | 18.9 | 20.6 | 17.6 |
| Example 12 (A:B = 5:1) | 6280.9 | 4.5 | 20.5 | 22.3 | 18.4 |
| Example 13 (A:B = 6:1) | 5456.5 | 4.9 | 17.8 | 17.8 | 14.6 |

TABLE 1-continued

Contrast Data of Mechanical Properties

| Items | Flexural moduli (megapascal) | Impact strengths (KJ/m$^2$) | Tensile-shear strengths (megapascal) | Compression shear strengths (megapascal) | Compression shear strengths after soaking 12 days (megapascal) |
|---|---|---|---|---|---|
| Example 14 (A:B = 7:1) | 4732.8 | 5.2 | 16.7 | 17.6 | 14.3 |
| Example 15 (A:B = 8:1) | 4906.3 | 5.4 | 15.8 | 16.7 | 13.8 |
| Example 16 (A:B = 9:1) | 5042.0 | 5.2 | 18.2 | 19.8 | 16.8 |
| Example 17 (A:B = 10:1) | 5931.5 | 4.9 | 19.7 | 20.1 | 17.9 |

3. The epoxy caulking adhesive has a better waterproof property than that of the unsaturated polyester resin. In humid environment, the bonding strength of the unsaturated polyester resin obviously decreases while the bonding strength of the epoxy caulking adhesive is nearly unaffected, thus the epoxy caulking adhesive is more applicable for waterproof projects or outdoor projects such as kitchen, bathroom and swimming pool, etc.

The flexural moduli are tested according to the Chinese National Standard GB/T 2570.

The impact strengths are tested according to the Chinese National Standard GB/T 2571, and non-notched small specimens prepared by casting are employed for the test.

The tensile-shear strengths are tested according to the Chinese National Standard GB/T 7124, and the result is the arithmetic average of the five specimens.

The compression shear strengths are tested according to 6.3.4 of the Chinese Construction Material Industrial Standard JC/T 547-1994.

Test instrument: A RGM-100 universal testing machine electronically controlled by a computer; as well as an XJC-25ZD electron impact tester.

Sample preparation environment: temperature 25° C., humidity 60%.

Testing environment: temperature 25° C., humidity 60%.

According to Table 1, the mechanical properties of the epoxy caulking adhesive exceed the national standard of the epoxy adhesive used to dry-hung stony curtain wall, and are better than those of the adhesive of the unsaturated polyester resin. According to FIG. 1, when soaking under 25° C. for 12 days, the tendency of the differentials of the compression shear strengths between the adhesive of unsaturated polyester resin and epoxy caulking adhesive increases from the 12$^{th}$ day. According to Table 1, compression shear strengths of each embodiment of the epoxy caulking adhesive are better than those of the adhesive of the unsaturated polyester resin.

The adhesive of the invention is characterized by comprising the component A and the component B. The component A and the component B are loaded in two parallel plastic pipes, with different ratio of 1:1, 2:1, 5:1, 10:1 (or other ratios as needed). In use, the component A and component B are automatically stirred and mixed to be an even and viscous paste in a mixing chamber, and the paste is extruded by a glue gun and injected into the gap. The epoxy caulking adhesive features good suspension property, thus the paste is stopped from flowing when faces vertical construction. The epoxy caulking adhesive is tightly connected to the target after curing at normal temperature.

The epoxy caulking adhesive adapted to use in humid environment employs an injection hard-plastic packaging, and unused glue can be employed next time, thereby avoiding waste. Slender gun head can penetrate into the interior of the gap, bringing in accurate fixed-point operation, simple and convenient operation, and shortened working hours. The helical gun head can equally mix the component A and the component B strictly in accordance with the designed ratio, avoiding negative effects to the bonding strength caused by manual unequally mixing.

BRIEF DESCRIPTION OF THE DRAWINGS

The invention is described hereinbelow with reference to accompanying drawings, in which the sole FIGURE is a tendency contrast curve of compression shear strengths when soaking between an epoxy waterproof caulking adhesive of the invention and an adhesive of the unsaturated polyester resin.

DETAILED DESCRIPTION OF THE EMBODIMENTS

For further illustrating the invention, experiments detailing an epoxy caulking adhesive are described below. It should be noted that the following examples are intended to describe and not to limit the invention.

The change tendencies with the soaking time of the compression shear strengths of an epoxy waterproof caulking adhesive and an adhesive of the unsaturated polyester resin are shown by FIG. 1. Under the same condition, the compression shear strengths of the epoxy caulking adhesive are bigger than those of the adhesive of the unsaturated polyester resin, and the epoxy caulking adhesive has better bonding strengths at normal temperature and in humid environment. In addition, as shown by FIG. 1, as the soaking time increases, the compression shear strengths of both the epoxy water proof caulking adhesive and the unsaturated polyester resin decrease. The epoxy caulking adhesive changes mildly and can keep the strength at 20 megapascal. In addition, the epoxy caulking adhesive shows good bonding strength when caulking, while the compression shear strengths of the adhesive of the unsaturated decrease violently below 5 megapascal after 12 days of soaking, and the bonding strength thereof is seriously affected.

The epoxy caulking adhesive adapted to use in humid environment comprises a component A and a component B. The component A at least comprises the following components in parts by weight: between 50 and 100 parts of an epoxy resin, between 0 and 100 part(s) of an inorganic filler, and between 0 and 20 part(s) of a thickener. The component B at least comprises the following components in parts by weight: between 20 and 100 parts of an amine curing agent, between 0 and 150 part(s) of the inorganic filler, and between 0 and 25 part(s) of the thickener. A weight ratio of the component A to the component B is between 1:1 and 10:1. The inorganic filler and the thickener in component A and component B are not allowed to be 0 at the same time.

The component A further comprises the following components in parts by weight: between 1 and 6 part(s) of a pigment, and between 2 and 20 parts of a diluent. The component B further comprises the following components in parts by weight: between 0.5 and 3 part(s) of an accelerator, and between 0.5 and 4 part(s) of a coupling agent.

The component A comprises the following components in parts by weight: between 50 and 90 parts of the epoxy resin, between 20 and 80 parts of the inorganic filler, between 3 and 10 parts of the thickener, between 1 and 5 part(s) of the pigment, and between 2 and 8 parts of the diluent. The component B comprises the following components in parts by weight: 40-80 parts of modified amine curing agent, between 1 and 2 part(s) of accelerator, between 0.5 and 2 part(s) of coupling agent, between 30 and 100 parts of inorganic filler, and between 2 and 10 parts of thickener.

The component A comprises the following components in parts by weight: between 60 and 80 parts of epoxy resin, between 30 and 70 parts of inorganic filler, between 8 and 10 parts of thickener, between 3 and 4 parts of pigment, between 3 and 10 parts of diluent. The component B comprises the following components in parts by weight: between 50 and 70 parts of modified amine curing agent, between 1 and 2 part(s) of accelerator, between 0.5 and 1 part(s) of coupling agent, 50-80 parts of inorganic filler, and between 3 and 8 parts of thickener.

The component A comprises the following components in parts by weight: 60 parts of epoxy resin, 40 parts of inorganic filler, 2 parts of thickener, 4 parts of pigment, 4 parts of diluent. The component B comprises the following components in parts by weight: 54 parts of modified amine curing agent, 2 parts of accelerator, 1 part of coupling agent, 50 parts of inorganic filler, and 3 parts of thickener.

The component A comprises the following components in parts by weight: 70 parts of epoxy resin, 50 parts of inorganic filler, 10 parts of thickener, 3 parts of pigment, 7 parts of diluent. The component B comprises the following components in parts by weight: 40 parts of modified amine curing agent, 1 part of accelerator, 1 part of coupling agent, 25 parts of inorganic filler, and 3 parts of thickener.

The component A comprises the following components in parts by weight: 85 parts of the epoxy resin, 50 parts of the inorganic filler, 5 parts of the thickener, 5 parts of the pigment, and 5 parts of the diluent. The component B comprises the following components in parts by weight: 20 parts of the modified amine curing agent, 0.5 part of the accelerator, 0.5 part of the coupling agent, 7 parts of the inorganic filler, and 2 parts of the thickener.

The component A comprises the following components in parts by weight: 100 parts of the epoxy resin, 100 parts of the inorganic filler, 5 parts of the thickener, 5 parts of the pigment, and 10 parts of the diluent. The component B comprises the following components in parts by weight: 20 parts of the modified amine curing agent, and 2 parts of the thickener.

The epoxy resin is selected from the group consisting of a bisphenol-A epoxy resin, a bisphenol-F epoxy resin, a bisphenol-S epoxy resin, an epoxy resin of glycidyl ester, an alicyclic epoxy resin, a phenolic epoxy resin, a hydrogenated bisphenol-A epoxy resin, a bisphenol-AD epoxy resin, and a mixture thereof.

The modified curing agent is selected from the group consisting of an aliphatic amine, an alicyclic amine, an aromatic amine, a polyamide, a modified amine, a phenol-aldehyde amine, a condensation amine, a polymercaptan amine, a hydroxyl alkylate polyamine, and a mixture thereof.

The inorganic filler is selected from the group consisting of calcium carbonate, a silica fume, barium sulfate, magnesium oxide, a quartz powder, a wollastonite, and clay.

The coupling agent is selected from the following: a silane coupling agent $RS_tX_3$, in which, R represents chlorine, a hydroxyl group, a carboxyl group, an amino group, a sulfydryl group, a vinyl group, an epoxy group, a cyano group, a cyanoethoxyl group, or a methacryloxy group, and X represents a methoxy group, an ethyoxy group, chlorine, the amino group, the sulfydryl group, glycidyl ether, methyl methacrylate, or the cyanoethoxyl group; and a titanate coupling agent $ROO_{4-n}Ti(OX\text{---}R'Y)_n$, in which, n=2, 3, R represents a hydrolysable short-chain alkoxy group, OX- represents the carboxyl group, an alkoxy group, a sulfonic group, or phosphorus, R' represents an alkane group with a long carbon bond, Y represents the hydroxyl group, the amino group, the epoxy group, or a group containing a double bond); such as γ-chloropropyl triethoxy silane, γ-aminopropyl triethoxysilane, γ-aminopropyl trimethoxysilane, γ-mercaptopropyl trimethoxysilane, γ-mercaptopropyl triethoxysilane, N-(β-aminoethyl)-γ-aminopropyl trimethoxy silane, isopropyl triisostearoyl titanate, isopropyl isopropyl trioleyl titanate, isopropyl tri(dioctylphosphate acyloxy) titanate, or di(octyl phenol ethoxylate) phospholipid.

The thickener is selected from the group consisting of a cellulose, a diatomite, an attapulgite, a fumed silica, a bentonite, a precipitated calcium carbonate, a talcum powder, a calcium stearate, and a mixture thereof.

The pigment of the component A is selected from the group consisting of titanium dioxide, a carbon black, a middle chrome yellow, an iron oxide yellow, an iron oxide red, a chromium oxide green, an ultramarine, a phthalocyanine blue, a phthalocyanine green, a lucifer yellow, an azo organic red pigment, an azo organic yellow pigment, an everbright fast red, a Lithol red, and a mixture thereof.

The diluent is selected from the group consisting of alkyl glycidyl ether containing between 12 and 14 carbon atoms, benzyl glycidyl ether, butyl glycidyl ether, glycerol polyglycidyl ether, ethylene glycol diglycidyl ether, neopentyl glycol diglycidyl ether, 1,4-butanediol diglycidyl ether, di-n-butyl phthalate, benzyl alcohol, toluene, ethyl acetate, acetone, xylene, propylene carbonate, and a mixture thereof.

The accelerator is selected from the group consisting of 2,4,6-tris(dimethylaminomethyl) phenol, tri-2-ethyl hexanoate of 2,4,6-tris(dimethylaminomethyl) phenol, trioleate salts of 2,4,6-tris(dimethylaminomethyl) phenol, and benzyldimethylamine.

The following technical solution are employed to solve the technical problems of the invention:

1. A bisphenol-A epoxy resin having a low molar weight (the molar weight ranges from 340 to 624) is employed as the main body of the component A to ensure a good bonding strength thereof. An active or non-active diluent is employed to adjust the viscosity thereof, and a resin component therein accounts for between 50 and 100 parts of the component A.

2. Fumed silica and bentonite are added into the component A and the component B respectively as thickener, so as to ensure the good suspension property of the mixture. Because hydroxyl groups in the fumed silica or bentonite molecules can react with the silanol groups dispersed between adjacent spherical particles in the base material via hydrogen bond to produce a loose lattice, or a three-dimensional network structure, thus gelation and very high structural viscosity are produced to change the rheological property of the colloid, prevent the filler from sedimentation, and maintain the uniformity of paste. However, shear from external forces tend to break the network structure as hydrogen bond is weak, thus gelation disappears, and the suspension property is thereby affected and can be restored when the external forces are removed.

3. Inorganic fillers selected from silicon powder, calcium carbonate, and barium sulfate etc. are added into the paste, with a particle size selected from 200-2000 meshes, so as to increase the density and ensure the mechanical property of the caulking adhesive. Moderate pigments can be added into the caulking adhesive, and the type and amount of pigments are determined by the pigment type and color depth.

4. The production method of the component A of the epoxy caulking adhesive is as follows: injecting the epoxy resin and diluent into a mixing tank, and adding the thickener such as silica fume, then mixing; adding different types of prepared fillers, mixing by the mixing tank, and adding pigments according to needs, then mixing; putting the reaction mixture into a three roll mill for grinding; and discharging a product and loading. The production method of the component B is as follows: using a dosage of curing agent which is corresponding to the dosage of epoxy resin used in component A, and adding with the accelerator and coupling agent into a mixer; adding fillers with different ratio, fully mixing and eliminating the air; and discharging a product and loading.

EXAMPLE 1

The component A comprises the following components in parts by weight: 47 parts of bisphenol-A epoxy resin, 13 parts of bisphenol-F epoxy resin, 3 parts of benzyl alcohol, 3 parts of fumed silica, 40 parts of active calcium carbonate, and 4 parts of Du Pont titanium dioxide. The component B comprises the following components in parts by weight: 14 parts of curing agent of aliphatic amine, 40 parts of curing agent of alicyclic amine, 2 parts of 2,4,6-tris(dimethylaminomethyl) phenol, 1 part of γ-aminopropyl triethoxysilane, 50 parts of wollastonite, and 3 parts of precipitated calcium carbonate. The weight ratio of the component A to the component B is 1:1.

EXAMPLE 2

The component A comprises the following components in parts by weight: 100 parts of bisphenol-A epoxy resin, 20 parts of butyl glycidyl ether, 20 parts of bentonite, 4 parts of phthalocyanine blue, 2 parts of iron oxide red, and 100 parts of calcium carbonate. The component B comprises the following components in parts by weight: 94 parts of polyamide, 150 parts of calcium carbonate, and 2 parts of γ-mercaptopropyl trimethoxysilane. The weight ratio of the component A to the component B is 1:1.

EXAMPLE 3

The component A comprises the following components in parts by weight: 55 parts of bisphenol-A epoxy resin, 5 parts of bisphenol-F epoxy resin, 40 parts of silica fume, 2 parts of cellulose, 4 parts of everbright fast red, and 4 parts of propylene carbonate. The component B comprises the following components in parts by weight: 54 parts of modified amine, 2 parts of 2,4,6-tris(dimethylaminomethyl) phenol, 1 part of γ-chloropropyl triethoxy silane, 50 parts of calcium carbonate, and 3 parts of diatomite. The weight ratio of the component A to the component B is 1:1.

EXAMPLE 4

The component A comprises the following components in parts by weight: 70 parts of bisphenol-AD epoxy resin, 5 parts of propylene carbonate, 8 parts of diatomite, 3 parts of Lithol red, and 50 parts of calcium carbonate. The component B comprises the following components in parts by weight: 65 parts of modified amine, 60 parts of clay, 2 parts of 2,4,6-tris(dimethylaminomethyl) phenol, 1 part of γ-mercaptopropyl trimethoxysilane, and 8 parts of cellulose. The weight ratio of the component A to the component B is 1:1.

EXAMPLE 5

The component A comprises the following components in parts by weight: 70 parts of bisphenol-A epoxy resin, 10 parts of fumed silica, 7 parts of neopentyl glycol diglycidyl ether, 3 parts of phthalocyanine green, and 50 parts of magnesium oxide. The component B comprises the following components in parts by weight: 40 parts of polymercaptan amine, 1 part of trioleate salt of 2,4,6-tris(dimethylaminomethyl) phenol, 1 part of γ-mercaptopropyl trimethoxysilane, 22 parts of precipitated calcium carbonate, and 3 parts of calcium stearate. The weight ratio of the component A to the component B is 2:1.

EXAMPLE 6

The component A comprises the following components in parts by weight: 80 parts of bisphenol-A epoxy resin, 15 parts of bisphenol-S epoxy resin, 4 parts of alkyl glycidyl ether containing between 12 and 14 carbon atoms (diluent), 4 parts of di-n-butyl phthalate, 15 parts of talcum powder, 2 parts of iron oxide yellow, and 100 parts of quartz powder. The component B comprises the following components in parts by weight: 100 parts of alicyclic amine, 1 part of tri-2-ethyl hexanoate of 2,4,6-tris(dimethylaminomethyl) phenol, 4 parts of the γ-aminopropyl trimethoxysilane, 5 parts of silicon powder with 1000 meshes. The weight ratio of the component A to the component B is 2:1.

EXAMPLE 7

The component A comprises the following components in parts by weight: 70 parts of hydrogenated bisphenol-A epoxy resin, 7 parts of xylene, 50 parts of barium sulfate, 10 parts of attapulgite, 2 parts of titanium dioxide, and 1 part of middle chrome yellow. The component B comprises the following components in parts by weight: 40 parts of polymercaptan amine, 1 part of 2,4,6-tris(dimethylaminomethyl) phenol, 1 part of γ-aminopropyl triethoxysilane, 25 parts of quartz powder, and 3 parts of talcum powder. The weight ratio of the component A to the component B is 2:1.

EXAMPLE 8

The component A comprises the following components in parts by weight: 90 parts of bisphenol-A epoxy resin, and 80 parts of calcium carbonate. The component B comprises the following components in parts by weight: 75 parts of the modified amine, 2 parts of 2,4,6-tris(dimethylaminomethyl) phenol, and 8 parts of fumed silica. The weight ratio of the component A to the component B is 2:1.

EXAMPLE 9

The component A comprises the following components in parts by weight: 75 parts of bisphenol-F epoxy resin, 100 parts of silica fume, and 2 parts of chromium oxide green. The component B comprises the following components in parts by weight: 50 parts of modified amine, and 9 parts of fumed silica. The weight ratio of the component A to the component B is 3:1.

EXAMPLE 10

The component A comprises the following components in parts by weight: 50 parts of bisphenol-F epoxy resin, 15 parts of glycerol polyglycidyl ether, 5 parts of ethyl acetate, 20 parts of fumed silica, and 3 parts of middle chrome yellow. The component B comprises the following components in parts by weight: 20 parts of modified amine, 3 parts of benzyldimethylamin, 2 parts of N-(β-aminoethyl)-γ-aminopropyl trimethoxy silane, and 6 parts of magnesium oxide. The weight ratio of the component A to the component B is 3:1.

EXAMPLE 11

The component A comprises the following components in parts by weight: 90 parts of bisphenol-A epoxy resin, 10 parts of phenolic epoxy resin, 5 parts of ethylene glycol diglycidyl ether, 5 parts of acetone, 95 parts of silica fume, and 5 parts of ultramarine. The component B comprises the following components in parts by weight: 20 parts of aromatic amine, 25 parts of cellulose, 4 parts of isopropyl triisostearoyl titanate, and 3.5 parts of diatomite. The weight ratio of the component A to the component B is 4:1.

EXAMPLE 12

The component A comprises the following components in parts by weight: 85 parts of bisphenol-AD epoxy resin, 5 parts of ethylene glycol diglycidyl ether, 50 parts of barium sulfate, 5 parts of bentonite, 2 parts of titanium dioxide, 1 part of middle chrome yellow, 1 part of iron oxide red, and 1 part of carbon black. The component B comprises the following components in parts by weight: 20 parts of phenol-aldehyde amine, 0.5 part of tri-2-ethyl hexanoate of 2,4,6-tris(dimethylaminomethyl) phenol, 0.5 part of di(octyl phenol ethoxylate) phospholipid, 7 parts of magnesium oxide, and 2 parts of diatomite. The weight ratio of the component A to the component B is 5:1.

EXAMPLE 13

The component A comprises the following components in parts by weight: 80 parts of bisphenol-A epoxy resin, 5 parts of bisphenol-F epoxy resin, 5 parts of 1,4-butanediol diglycidyl ether, 80 parts of silica fume of 1800 meshes, 5 parts of fumed silica, and 5 parts of azo organic yellow pigment. The component B comprises the following components in parts by weight: 22 parts of curing agent of condensation amine, 3 parts of 2,4,6-tris(dimethylaminomethyl) phenol, 2 parts of γ-chloropropyl triethoxy silane, and 3 parts of fumed silica. The weight ratio of the component A to the component B is 6:1.

EXAMPLE 14

The component A comprises the following components in parts by weight: 94 parts of bisphenol-A epoxy resin, 20 parts of neopentyl glycol diglycidyl ether, 100 parts of active calcium carbonate, 5 parts of fumed silica and 5 parts of azo organic red pigment. The component B comprises the following components in parts by weight: 20 parts of aliphatic amine, 2 parts of isopropyl trioleyl titanate, and 10 parts of barium sulfate. The weight ratio of the component A to the component B is 7:1.

EXAMPLE 15

The component A comprises the following components in parts by weight: 100 parts of bisphenol-S epoxy resin, 20 parts of benzyl glycidyl ether, 100 parts of active calcium carbonate, and 20 parts of fumed silica. The component B comprises the following components in parts by weight: 22 parts of curing agent of condensation amine, 4 parts of isopropyl tri(dioctylphosphate acyloxy) titanate, and 4 parts of barium sulfate. The weight ratio of the component A to the component B is 8:1.

EXAMPLE 16

The component A comprises the following components in parts by weight: 98 parts of bisphenol-S epoxy resin, 90 parts of silica fume, 7 parts of fumed silica, and 3 parts of lucifer yellow. The component B comprises the following components in parts by weight: 20 parts of aliphatic amine, and 2 parts of cellulose. The weight ratio of the component A to the component B is 9:1.

EXAMPLE 17

The component A comprises the following components in parts by weight: 100 parts of alicyclic epoxy resin, 10 parts of methylbenzene, 100 parts of quartz powder, 5 parts of fumed silica, and 5 parts of chromium oxide green. The component B comprises the following components in parts by weight: 20 parts of hydroxyl alkylate polyamine (curing agent), and 2 parts of calcium stearate. The weight ratio of the component A to the component B is 10:1.

Unless otherwise indicated, the numerical ranges involved in the invention include the end values.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. An epoxy caulking adhesive, comprising:
    a component A, the component A comprising the following components in parts by weight: 100 parts of an epoxy resin, 100 parts of an inorganic filler, 5 parts of a thickener, 5 parts of a pigment, and 10 parts of a diluent; and
    a component B, the component B comprising the following components in parts by weight: 20 parts of an amine curing agent, between 30 and 100 parts of the inorganic filler, between 1 and 2 part(s) of an accelerator, between 0.5 and 2 part(s) of a coupling agent, and 2 parts of the thickener;

wherein:
a weight ratio of the component A to the component B is between 1:1 and 10:1.

2. An epoxy caulking adhesive, comprising:
a component A, the component A comprising the following components in parts by weight: 60 parts of an epoxy resin, 40 parts of an inorganic filler, 2 parts of a thickener, 4 parts of a pigment, and 4 parts of a diluent; and
a component B, the component B comprising the following components in parts by weight: 54 parts of an amine curing agent, 2 parts of an accelerator, 1 part of a coupling agent, 50 parts of the inorganic filler, and 3 parts of the thickener;

wherein:
a weight ratio of the component A to the component B is between 1:1 and 10:1.

3. An epoxy caulking adhesive, comprising:
a component A, the component A comprising the following components in parts by weight: 60 parts of an epoxy resin, 40 parts of an inorganic filler, 2 parts of a thickener, 4 parts of a pigment, and 4 parts of a diluent; and
a component B, the component B comprising the following components in parts by weight: 54 parts of an amine curing agent, 2 parts of an accelerator, 1 part of a coupling agent, 50 parts of the inorganic filler, and 3 parts of the thickener;

wherein:
a weight ratio of the component A to the component B is between 1:1 and 10:1.

4. An epoxy caulking adhesive, comprising:
a component A, the component A comprising the following components in parts by weight: 70 parts of an epoxy resin, 50 parts of an inorganic filler, 10 parts of a thickener, 3 parts of a pigment, and 7 parts of a diluent; and
a component B, the component B comprising the following components in parts by weight: 40 parts of an amine curing agent, 1 part of an accelerator, 1 part of a coupling agent, 25 parts of the inorganic filler, and 3 parts of the thickener;

wherein:
a weight ratio of the component A to the component B is between 1:1 and 10:1.

5. An epoxy caulking adhesive, comprising:
a component A, the component A comprising the following components in parts by weight: 85 parts of an epoxy resin, 50 parts of an inorganic filler, 5 parts of a thickener, 5 parts of a pigment, and 5 parts of a diluent; and
a component B, the component B comprising the following components in parts by weight: 20 parts of an amine curing agent, 0.5 part of an accelerator, 0.5 part of a coupling agent, 7 parts of the inorganic filler, and 2 parts of the thickener;

wherein:
a weight ratio of the component A to the component B is between 1:1 and 10:1.

* * * * *